(12) United States Patent
Hong et al.

(10) Patent No.: US 12,136,715 B2
(45) Date of Patent: Nov. 5, 2024

(54) BATTERY PACK HOUSING

(71) Applicant: UIF (University Industry Foundation), Yonsei University, Seoul (KR)

(72) Inventors: Jong Sup Hong, Seoul (KR); Min Uk Kim, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 297 days.

(21) Appl. No.: 17/224,433

(22) Filed: Apr. 7, 2021

(65) Prior Publication Data

US 2021/0320341 A1    Oct. 14, 2021

(30) Foreign Application Priority Data

Apr. 8, 2020 (KR) .................. 10-2020-0042718

(51) Int. Cl.
*H01M 10/613* (2014.01)
*H01M 10/647* (2014.01)
(Continued)

(52) U.S. Cl.
CPC ....... *H01M 10/613* (2015.04); *H01M 10/647* (2015.04); *H01M 10/6556* (2015.04);
(Continued)

(58) Field of Classification Search
CPC ............ H01M 10/613; H01M 10/647; H01M 10/6556; H01M 10/6557; H01M 10/6567;
(Continued)

(56) References Cited

U.S. PATENT DOCUMENTS

| 2010/0291428 A1* | 11/2010 | Graban ............. H01M 10/6551 429/120 |
| 2012/0009456 A1* | 1/2012 | Sohn ................. H01M 10/6563 429/120 |

FOREIGN PATENT DOCUMENTS

| JP | 2010118239 A | 5/2010 |
| KR | 1020130031532 A | 3/2013 |

(Continued)

OTHER PUBLICATIONS

Korean Office Action for corresponding Korean Patent Application No. 10-2020-0042718 issued on Aug. 23, 2021.

*Primary Examiner* — Lingwen R Zeng
(74) *Attorney, Agent, or Firm* — Tarolli, Sundheim, Covell & Tummino LLP

(57) ABSTRACT

A battery pack housing for improved cooling efficiency of a battery cell is disclosed. A cooling fluid introduced into a battery pack of the battery pack housing flows to generate turbulence around a battery tab at which high-temperature heat is typically generated. A flow rate and a flow velocity of the cooling fluid may be increased around the battery tab, the cooling fluid may be more actively circulated, and a temperature deviation between cells in the battery pack may be effectively reduced so that performance degradation of the battery pack may be prevented and a lifetime of the battery pack may be increased. In addition, even when the same amount of cooling fluid is used, the cooling efficiency of the battery pack may be improved, and an amount of the fluid needed for cooling may be reduced to simplify an entire system of the battery pack.

9 Claims, 9 Drawing Sheets

(51) Int. Cl.
*H01M 10/6556* (2014.01)
*H01M 10/6567* (2014.01)
*H01M 50/204* (2021.01)
*H01M 10/6557* (2014.01)
*H01M 50/209* (2021.01)
*H01M 50/289* (2021.01)

(52) U.S. Cl.
CPC ..... *H01M 10/6567* (2015.04); *H01M 50/204* (2021.01); *H01M 10/6557* (2015.04); *H01M 50/209* (2021.01); *H01M 50/289* (2021.01)

(58) Field of Classification Search
CPC . H01M 50/204; H01M 50/209; H01M 50/289
See application file for complete search history.

(56) References Cited

FOREIGN PATENT DOCUMENTS

| | | |
|---|---|---|
| KR | 1020150094030 A | 8/2015 |
| KR | 1017500690000 B1 | 6/2017 |
| KR | 1020444260000 B1 | 11/2019 |
| KR | 1020711340000 B1 | 1/2020 |
| KR | 1020150142900 A | 2/2020 |
| KR | 1020761680000 B1 | 2/2020 |

* cited by examiner

BATTERY PACK HOUSING

This application claims priority to and the benefit of Korean Patent Application No. 10-2020-0042718, filed on Apr. 28, 2020, the disclosure of which is incorporated herein by reference in its entirety.

BACKGROUND

Field of the Invention

The present invention relates to a battery pack housing for improving cooling efficiency of a battery cell.

Discussion of Related Art

As pollution problems occurring due to internal combustion engines and the like are emerging, as a solution for the pollution problems, electric vehicles (EVs) and hybrid EVs are drawing attention as eco-friendly transportation means replacing the conventional internal combustion engines. Accordingly, interest in high performance and high capacity batteries, which are power sources of the EVs, is increasing, and many schools, companies, and research institutes are actively researching and developing battery packs. Since an enormous amount of power, such as thousands of times an amount of power of a typical smartphone is required to drive the EV, at least several tens to several thousands of battery cells are installed in the EV. In order to safely and effectively manage a number of battery cells, the plurality of battery cells are disposed in one frame to form a battery, and a battery management system (BMS) configured to manage a temperature, a voltage, and the like, a cooling device, and the like are added to the battery module to ultimately form a battery pack.

The performance of the battery pack is typically determined by a temperature at which the battery cells are driven, and it is important to properly maintain an average temperature in the cells in the battery pack and reduce a temperature deviation between the cells. It has been known that the proper driving temperature of the battery cells is in the range of 20° C. to 50° C. In a case in which the temperature of the cell is out of the temperature range when charging, discharging, or driving the battery, there is a possibility of fire and even explosion, as well as performance degradation of the battery cell. In addition, an electrochemical reaction, charging and discharging efficiency, charge acceptance, and the like are adversely affected by the out of the temperature range, and finally, a lifetime of the battery is reduced. In addition, when internal resistance unbalance occurs between the cells due to the temperature deviation, a problem occurs in that the battery module should be replaced even though many available battery cells remain.

Accordingly, a battery cooling system capable of maintaining a proper temperature of a battery and reducing a temperature deviation between cells is required. The battery is generally cooled for each battery module using a cooling fluid. Cooling methods may be typically divided into an air-cooling method and a water-cooling method. In the air-cooling method, a cooling fan is generally attached to a battery tray, and air is suctioned from the outside by the cooling fan, is cooled from an entrance of the battery tray, and is discharged through an exit at a rear side of the battery tray. The water-cooling method is a method which is used in a case in which an amount of heat is relatively large and in which cooling water is introduced into a battery pack by a water-cooling plate to cool the battery pack.

However, in such existing cooling methods, since heating properties generated in the battery pack are not considered and injection of a cooling fluid into the battery pack and discharging of the cooling fluid are simply considered, there is a problem in that the battery pack is not effectively cooled.

RELATED ART

[Patent Document]
Korean Patent Registration No. 10-1750069 (Jun. 16, 2017)

SUMMARY OF THE INVENTION

The present invention is directed to providing a battery pack housing capable of improving a cooling efficiency and performance of an entire battery pack by allowing a flow rate and a flow velocity of a cooling fluid to be increased at the part where the electrode tab is positioned, which generates mainly high heat In order to achieve the above-described objective, the present invention provides a battery pack housing including an inner space for accommodating a plurality of battery modules each including a cathode tab and an anode tab, a plurality of protruding portions which are formed to protrude from the inner space and accommodate one or more of the cathode tabs and the anode tabs of the battery modules, a fluid inlet provided on one side surface of the battery pack housing, and a fluid outlet provided on the other side surface thereof.

In addition, the present invention provides a battery pack including the housing.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
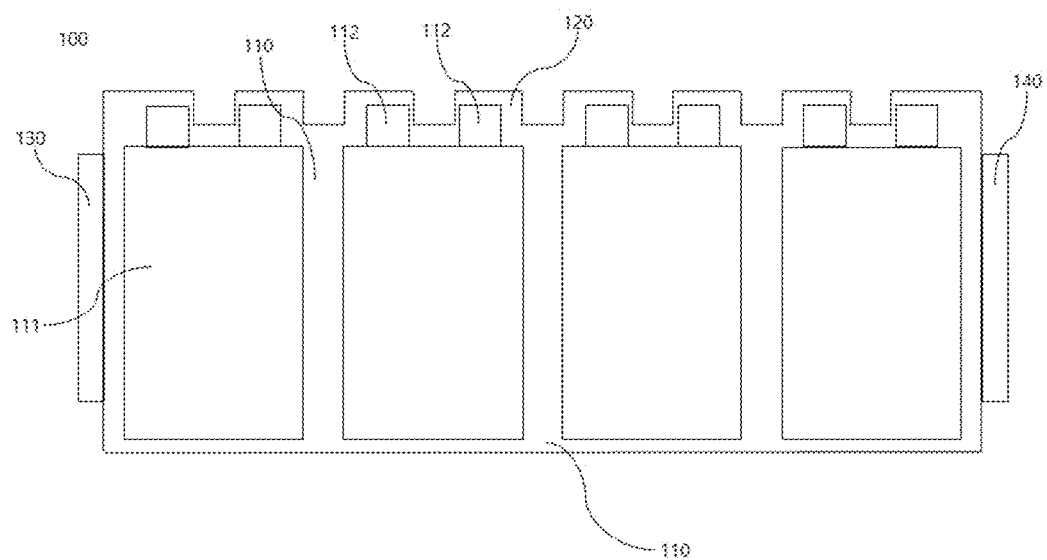
FIG. 1 is a view illustrating a battery pack housing according to an embodiment of the present invention.

Since the present invention, which will be described below, allows for various changes and numerous embodiments, specific embodiments will be illustrated in the accompanying drawings and described in detail in the written description. However, this is not intended to limit the present invention to the specific embodiments, and it is to be appreciated that all changes, equivalents, and substitutes that do not depart from the spirit and technical scope of the present invention are encompassed in the present invention.

Although the terms "first," "second," "A," "B," and the like may be used herein to describe various elements, these elements should not be limited by these terms. These terms are only used to distinguish one element from another element. For example, a first element could be termed a second element and, similarly, a second element could be termed a first element without departing from the scope of the present invention. As used herein, the term "and/or" includes any one or any combination among a plurality of associated listed items.

It should be understood that the description of a singular form in the present specification includes a description of a plural form unless the context clearly indicates otherwise, and it should be further understood that the terms "comprise," and the like specify the presence of stated features, numbers, steps, operations, elements, components or combinations thereof but do not preclude the presence or addition of one or more other features, numbers, steps, operations, elements, components, or combinations thereof.

Prior to describing the drawings in detail, it should be clarified that classification of components in the present specification is only based on main functions performed by the components. That is, two or more components, which will be described below, may be provided to be combined into one component, alternatively, or one component may be provided to be divided into two or more components according to subdivided functions. In addition, each of the components may additionally perform a part or entity of a function performed by another component as well as a main function thereof, and a part or entirety of a main function performed by each of the components may be exclusively charged to and performed by another component.

In addition, when a method or an operational method is performed, operations included in the method may be performed in an order different from a described order unless the context clearly indicates a specific order. That is, the operations may be performed in an order which is the same as the described order, actually performed at the same time, or performed in a reverse order of the described order.

As one aspect of the present invention, there is provided a battery pack housing including an inner space for accommodating a plurality of battery modules including cathode tabs and anode tabs, a plurality of protruding portions which are formed to protrude from the inner space and accommodate one or more of the cathode tabs and the anode tabs of the battery modules, a fluid inlet provided on one side surface of the battery pack housing, and a fluid outlet provided on the other side surface thereof.

As one embodiment of the present invention, the plurality of battery modules may be accommodated in the inner space to be spaced apart from each other, and the plurality of protruding portions may be formed to be spaced a distance from each other.

As another embodiment of the present invention, the plurality of battery modules may be housed in the internal space so as to be separated from each other and one or more of the protruding portions may be housed as a group by selecting one of the cathode tab and the anode tab in each of the adjacent battery modules.

As still another embodiment of the present invention, the battery module is provided as a plurality of battery modules which are accommodated in the inner space to be spaced apart from each other, the protruding portion is provided as a plurality of protruding portions, and one or more of the protruding portions may accommodate the cathode tab and the anode tab of one battery module as one group.

As yet another embodiment of the present invention, the battery pack housing may further include one or more groove portions formed in a direction from a lower surface of the battery pack housing toward the inner space, wherein the plurality of battery modules may be accommodated in the inner space so that the cathode tab and the anode tab may face upward, and the groove portions may be provided between the battery modules.

As yet another embodiment of the present invention, the groove portions may be disposed in a lower portion of the battery pack housing in a direction in which a cooling fluid flows, the protruding portions may be disposed in the direction in which the cooling fluid flows, and the groove portions and the protruding portions may be alternately disposed in the direction in which the cooling fluid flows.

As yet another embodiment of the present invention, an outer surface of the groove portion may be formed in a form that is engaged with an outer surface of the protruding portion.

As yet another embodiment of the present invention, the battery pack housing may further include a first coupling unit provided on one side of an outer surface of the battery pack housing, and a second coupling unit which is provided on the other side of the outer surface of the battery pack housing and corresponds to the form of the first coupling unit to be engaged with the first coupling unit.

As another aspect of the present invention, there is provided a battery pack including the battery pack housing.

Hereinafter, the present invention will be described in detail to aid understanding of the present invention with reference to the accompanying drawings. However, embodiments, which will be described below, are provided only to facilitate understanding of the present invention and do not limit the contents of the present invention.

Figure 2:
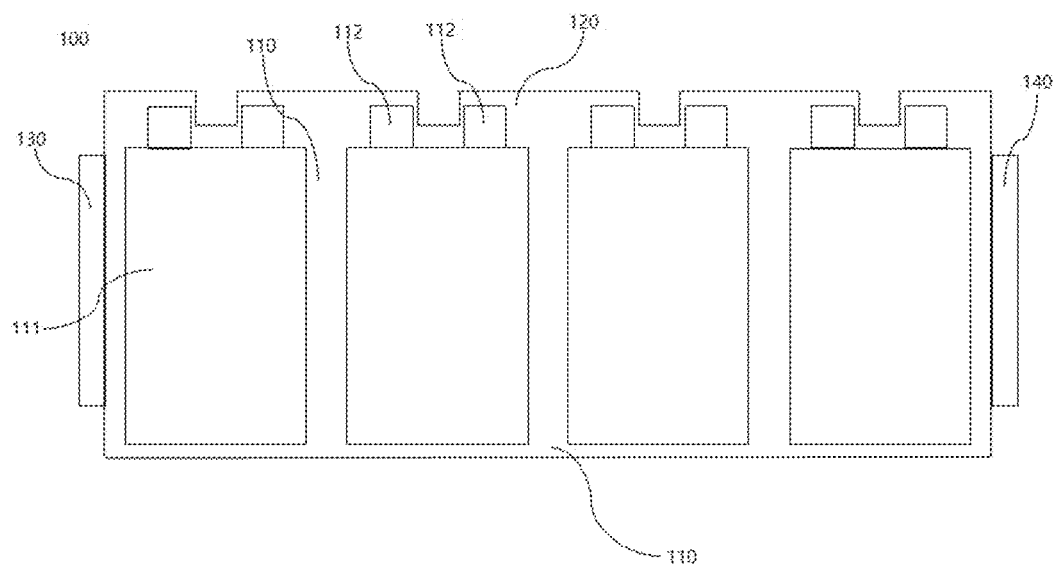
FIG. 2 is a view illustrating a battery pack housing according to another embodiment of the present invention.
Figure 3:
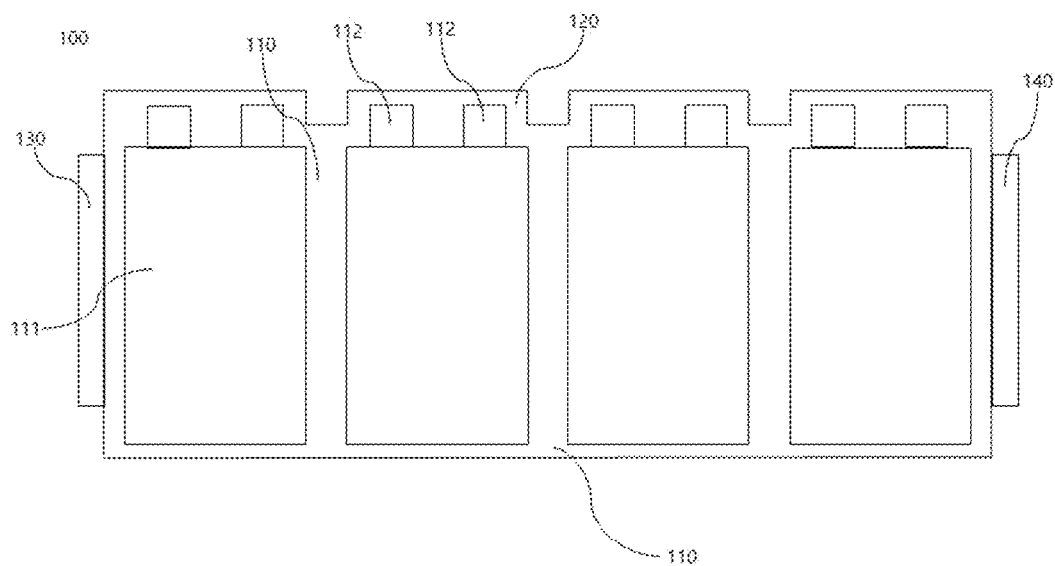
FIG. 3 is a view illustrating a battery pack housing according to still another embodiment of the present invention.

In FIGS. 1 to 3, a structure of a battery pack housing 100 according to the present invention is schematically illustrated. Referring to FIGS. 1 to 3, the battery pack housing 100 according to the present invention includes an inner space 110, protruding portions 120, a fluid inlet 130, and a fluid outlet 140.

The inner space 110 is a space which is formed by an inner surface of the battery pack housing 100 and in which a plurality of battery modules 111 are accommodated. The inner space 110 may be formed in one of various forms according to the form and arrangement of the battery modules 111. For example, the inner space 110 may be formed as a rectangular hexagonal space, but the present invention is not limited thereto.

The number of the battery modules 111 accommodated in the inner space 110 may be properly adjusted according to a performance condition required for a battery pack 10, and a position at which the battery modules 111 are accommodated may be properly selected according to a design condition. For example, the battery modules 111 may be accommodated in the inner space 110 to be spaced apart from each other in a one axial direction of the inner space 110. Since a large amount of heat is generated in the battery modules 111 during charging or discharging, in a case in which the plurality of battery modules 111 are accommodated therein, the battery modules 111 may be disposed to be spaced apart from each other so that a cooling fluid flows between the battery modules 111.

In the inner space 110, a guide member which guides an accommodation position of the battery module 111 and a fixing member extending from the inner surface of the battery pack housing 100 to fix the battery module 111 to the inner space 110 may be provided. In addition, a buffer member capable of absorbing external vibration and impacts may be provided on the inner surface at which the battery module 111 is in contact with a housing of the battery pack 10.

Meanwhile, In the battery module 111, a plurality of battery cells with electrode tabs 112 formed on one side are combined.

A cathode tab 112a and an anode tab 112b are commonly referred to as the electrode tabs 112. Since the battery module 111 according to the present invention is a battery module used to manufacture a general battery pack, a description of a detailed structure thereof will be omitted.

The protruding portion 120 is formed to protrude from the inner space for accommodating the battery module 111. The protruding portion 120 forms a space for accommodating a portion of the electrode tab 112 of the battery module 111. The protruding portion 120 may be properly formed to have an arbitrary height in consideration of cooling efficiency according to a size of the inner space 110, the shape and form of the electrode tab 112, and the like.

Although an angle of an inner surface and a protruding length of the protruding portion 120 and the size and form of the accommodation space may differ according to a size and the shape of electrode tab 112, one side surface of the protruding portion 120 may be formed to face a movement direction of the cooling fluid so that the cooling fluid passing through an inner portion of the battery pack housing collides with the protruding portion 120.

As one specific example, as illustrated in FIG. 1, in the protruding portion 120, a space for accommodating one of the electrode tabs 112, which are the cathode tab 112a and the anode tab 112b, of the battery module 111 may be formed.

As another specific example, as illustrated in FIG. 2, in the protruding portion 120, a space, which accommodates one electrode tab 112, which is any one of the cathode tab 112a and the anode tab 112b, one by one selected from each of the plurality of battery modules 111 accommodated adjacent to each other as one group, may be formed, the plurality of the battery modules may be housed in an internal space so as to be separated from each other, and one or more of the protruding portions may be housed as a group by selecting one of the negative electrode and anode tabs in each of the adjacent battery modules.

As still another specific example, as illustrated in FIG. 3, in the protruding portion 120, a space, which accommodates the electrode tabs 112, which are the cathode tab 112a and the anode tab 112b, of one battery module 111 as one group, may be formed.

However, a manner in which the protruding portion 120 accommodates the electrode tabs 112 is not limited to any one of the above-described manners, and the electrode tabs 112 may be accommodated in a manner other than the above-described manners or may be accommodated in a combined manner of the above-described manners.

The protruding portion 120 allows the cooling fluid introduced into the inner space 110 of the battery pack housing 100 to collide with the inner surface of the protruding portion 120 so as to generate turbulence in a space around the electrode tab 112. Accordingly, a flow rate and a flow velocity of the cooling fluid introduced into the space around the electrode tab 112 may be increased, and the cooling fluid may be more actively circulated so that a temperature of the electrode tab 112 which generates a relatively large amount of heat may be effectively decreased.

The fluid inlet 130 is a portion which is provided on one side surface of the battery pack housing 100 and through which the cooling fluid for cooling the battery module 111 accommodated in the inner space 110 is introduced.

The fluid outlet 140 is a portion which is provided on the other side surface of the battery pack housing 100 and through which the cooling fluid with an increased temperature after cooling the battery module 111 accommodated in the inner space 110 is discharged.

The fluid inlet 130 and the fluid outlet 140 may be provided to have the same form and size, but the forms and sizes thereof may also be different from each other to adjust a flow rate and a flow velocity of the cooling fluid in the inner space 110.

Meanwhile, the fluid inlet 130 and the fluid outlet 140 may be disposed opposite to each other, but since a temperature of the discharged cooling fluid is higher than a temperature of the introduced cooling fluid, the fluid inlet 130 may be provided at a position lower than a position of the fluid outlet 140 so that the fluid smoothly flows in the inner space 110.

Meanwhile, a control valve which is automatically opened or closed to control a flow rate of the cooling fluid may be coupled to one or more of the fluid inlet 130 and the fluid outlet 140. The control valve may be a ball valve, a globe valve, a gate valve, a control valve, a k valve, a butterfly valve, or the like, but the present invention is not limited thereto.

In addition, a fluid inlet device or a fluid outlet device for aiding in introducing or discharging the cooling fluid may be connected to one or more of the fluid inlet 130 and the fluid outlet 140. A blower such as a centrifugal blower, an axial blower, a four-flow blower, and a cross-flow blower, or a pump such as a turbo-type pump, a displacement-type pump, or a special-type pump may be used as the fluid inlet device or the fluid outlet device, but the present invention is not limited thereto. In addition, the fluid inlet device or the fluid outlet device may also be disposed in series with the control valve to directly control a flow rate of the cooling fluid in the inner space 110.

The cooling fluid is liquid or gas and is a fluid capable of exchanging heat by transferring heat in a single-phase state. A well-known refrigerant may be appropriately selected as the cooling fluid according to a supply or circulation method and, for example, air, water, ammonia, a hydrocarbon refrigerant, a halon carbon refrigerant, sulfurous acid gas, an azeotropic or non-azeotropic refrigerant thereof, or the like may be used as the cooling fluid, but the present invention is not limited thereto.

Meanwhile, the battery pack housing 100 according to the present invention may further include one or more groove portions 150. The groove portions 150 are formed in a direction from a lower surface of the battery pack housing 100 toward the inner space 110.

Figure 4:
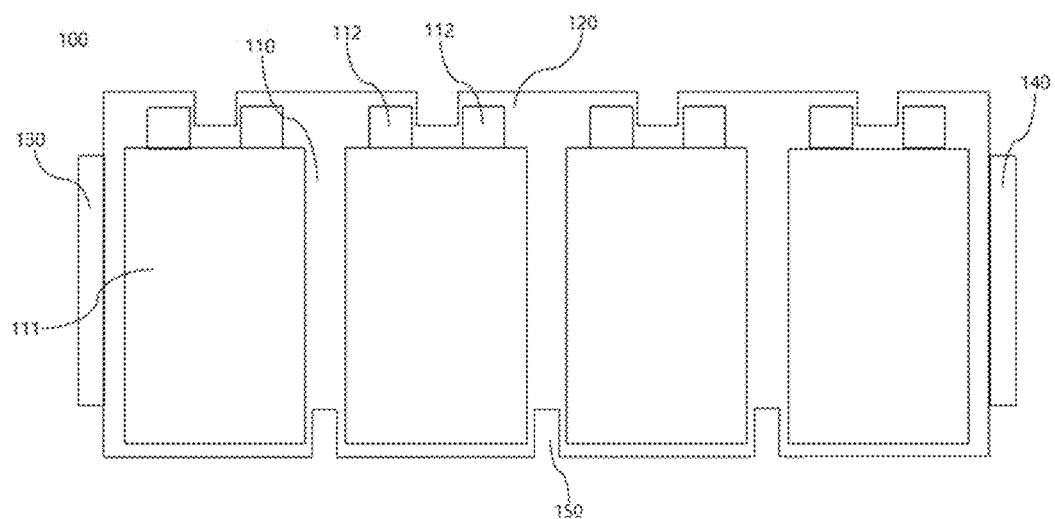
FIG. 4 is a view illustrating a battery pack housing according to yet another embodiment of the present invention.
Figure 5:
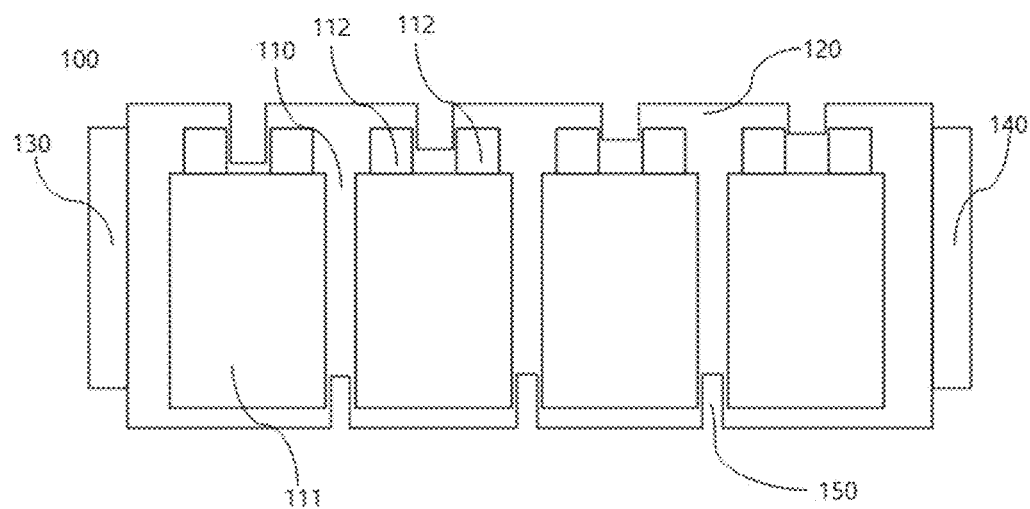
FIG. 5 is a view illustrating a battery pack housing according to yet another embodiment of the present invention.
Figure 6:
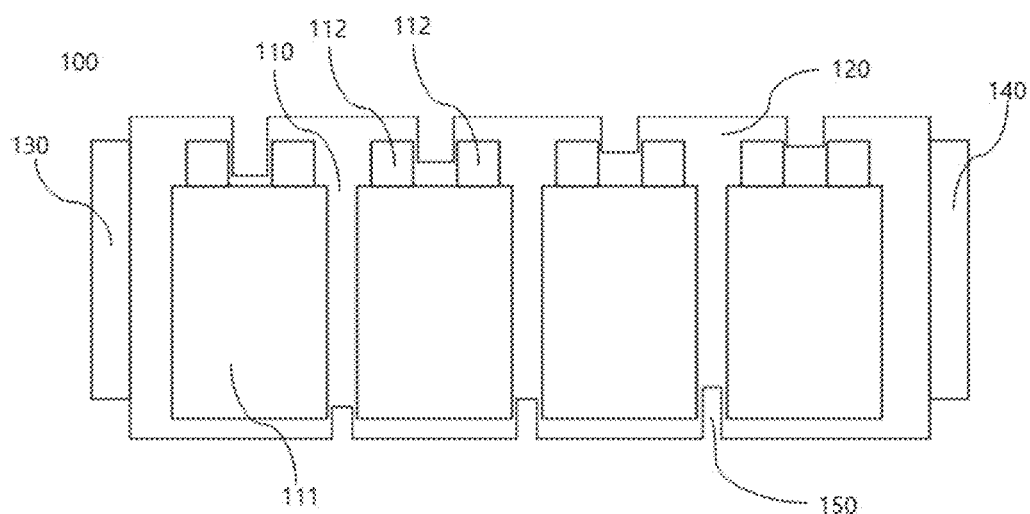
FIG. 6 is a view illustrating a battery pack housing according to yet another embodiment of the present invention.
Figure 7:
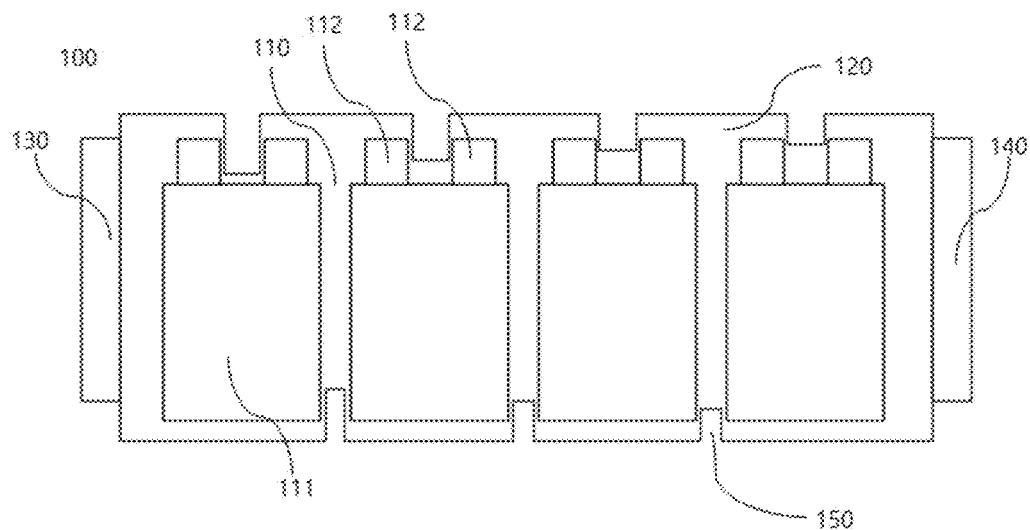
FIG. 7 is a view illustrating a battery pack housing according to yet another embodiment of the present invention.
Figure 8:
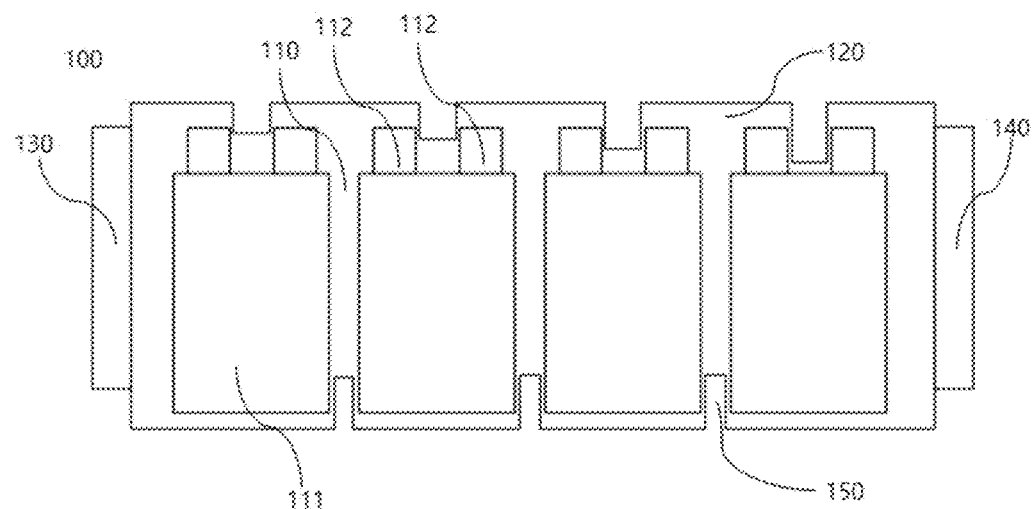
FIG. 8 is a view illustrating a battery pack housing according to yet another embodiment of the present invention.
Figure 9:
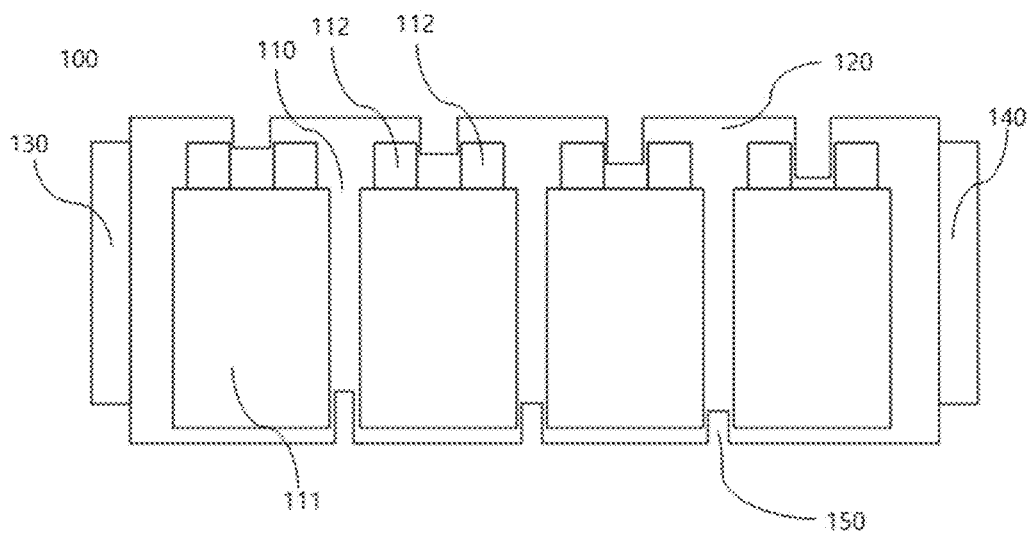
FIG. 9 is a view illustrating a battery pack housing according to yet another embodiment of the present invention.
Figure 10:
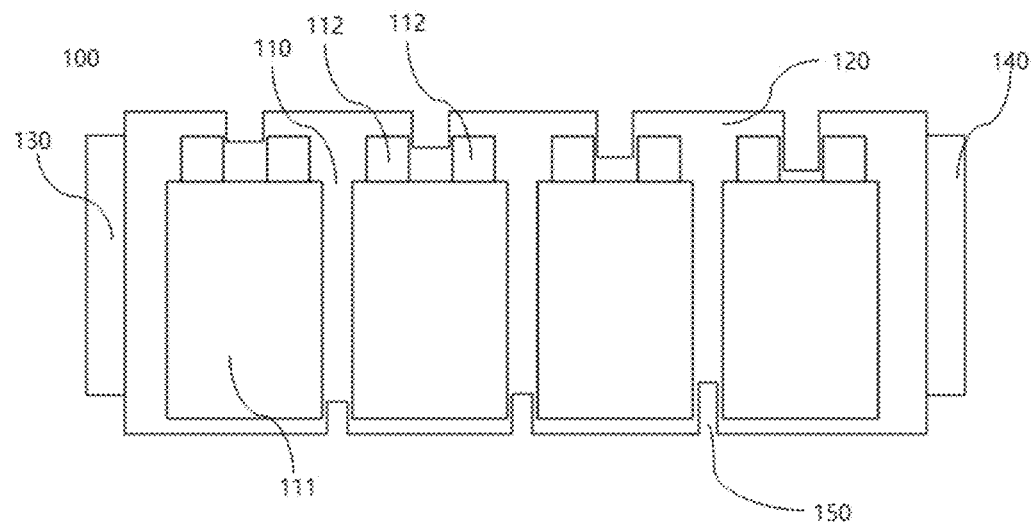
FIG. 10 is a view illustrating a battery pack housing according yet another embodiment of to the present invention.
Figure 11:
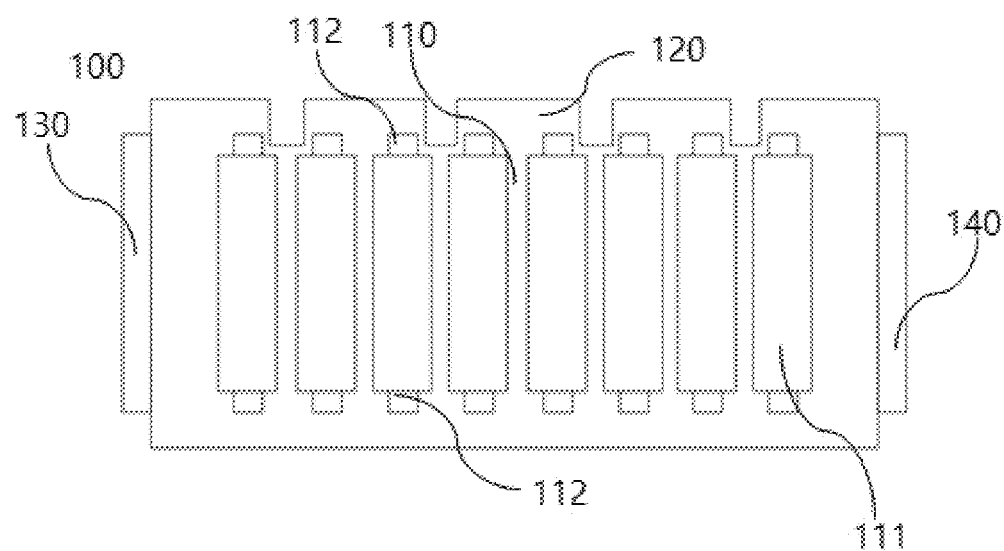
FIG. 11 is a view illustrating a battery pack housing according to yet another embodiment of the present invention.
Figure 12:
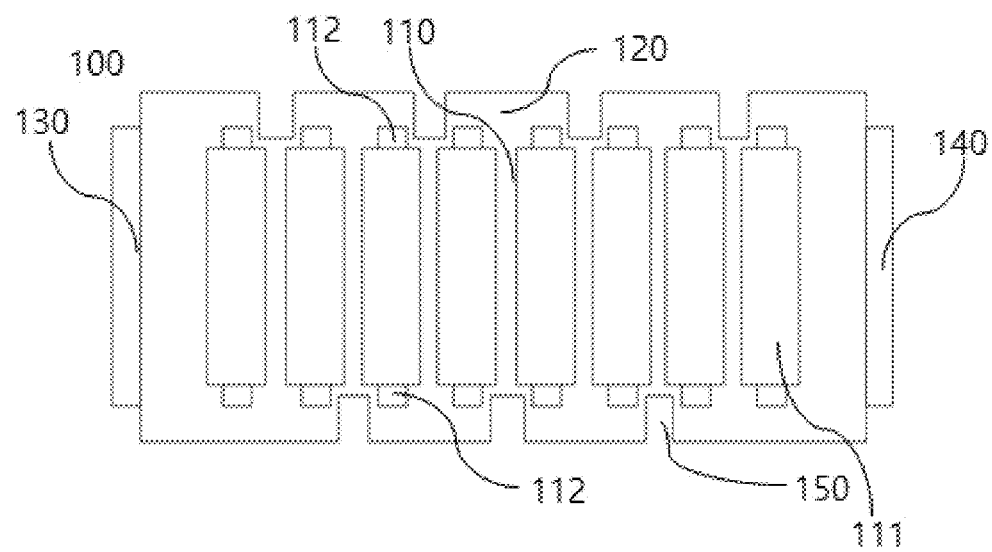
FIG. 12 is a view illustrating a battery pack housing according to yet another embodiment of the present invention.
Figure 13:
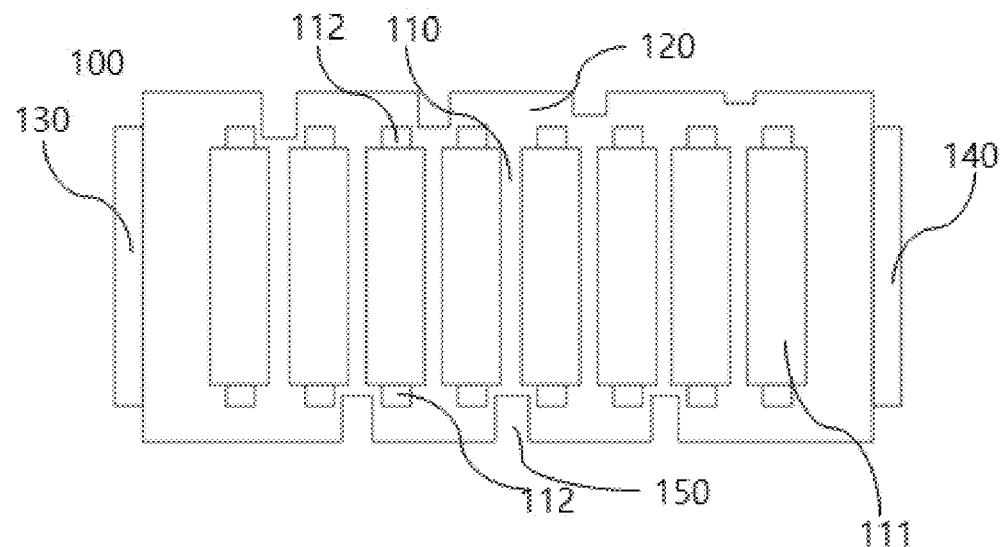
FIG. 13 is a view illustrating a battery pack housing according to yet another embodiment of the present invention.
Figure 14:
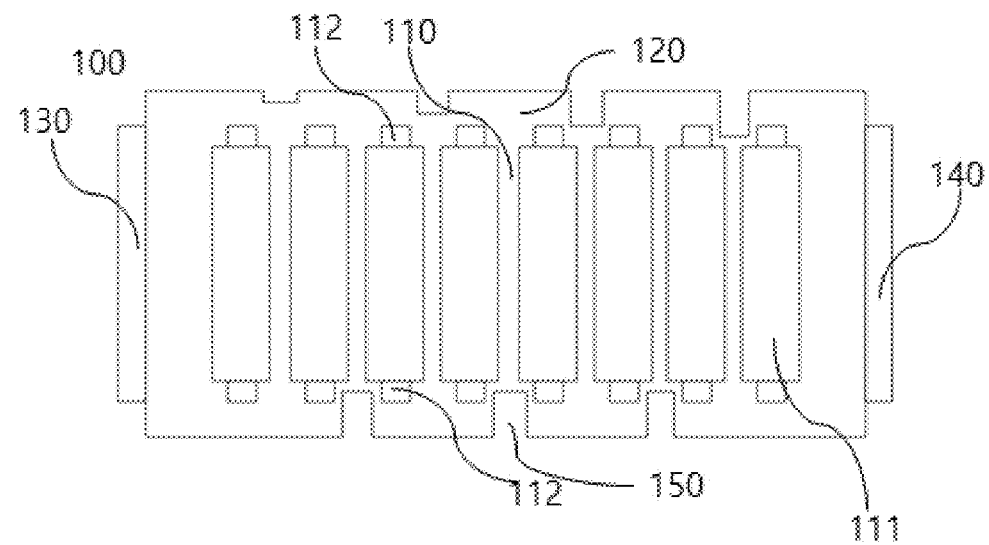
FIG. 14 is a view illustrating a battery pack housing according to yet another embodiment of the present invention.
Figure 15:
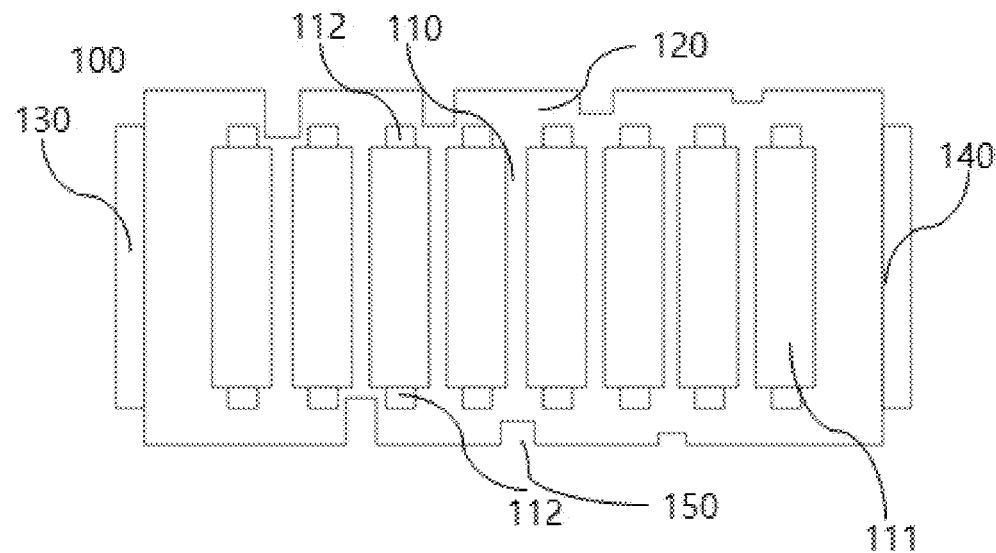
FIG. 15 is a view illustrating a battery pack housing according to yet another embodiment of the present invention.
Figure 16:
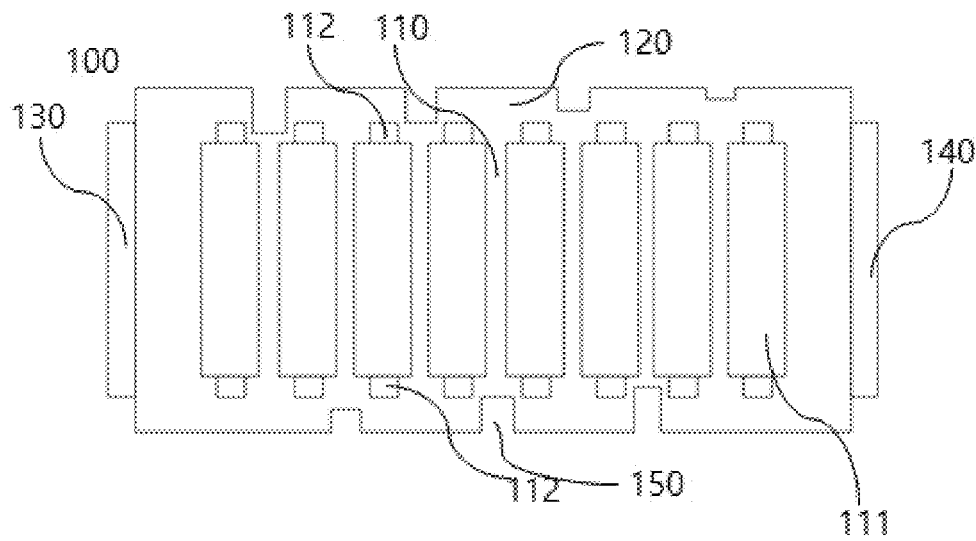
FIG. 16 is a view illustrating a battery pack housing according to yet another embodiment of the present invention.

In FIG. 4, a structure of the battery pack housing 100 including the groove portion 150 according to the present invention is schematically illustrated. Referring to FIG. 4, in the case in which the plurality of battery modules are accommodated in the inner space so that the cathode tab 112a and the anode tab 112b face an upper portion of the housing, the groove portion 150 may be formed in a direction from the lower surface of the battery pack housing 100 toward the inner space. The groove portion 150 may be properly formed to have an arbitrary height in consideration of cooling efficiency according to the size of the inner space 110 and the form and shape of the battery module 111.

Meanwhile, the groove portions 150 may be provided between the plurality of battery modules 111. In the battery pack housing 100 having such a structure, the groove portions 150 are disposed in a lower portion in a direction in which the cooling fluid flows, and the protruding portions 120 may be disposed in the upper portion in the direction in which the cooling fluid flows.

The groove portion 150 serves as a partition for pushing the cooling fluid passing through the lower portion of the battery pack housing 100 upward in a direction toward the protruding portion 120 positioned at the upper portion thereof. According to such a structure of the groove portion 150, the cooling fluid quickly passing through the lower portion of the battery pack housing 100 may be pushed between the cells of the battery module 111, and a flow rate and a flow velocity of the cooling fluid introduced into the protruding portion 120 are increased so that heat generated by the electrode tab 112 may be more effectively cooled. In a case in which the flow direction of the fluid coming into contact with the groove portion 150 and flowing upward is considered, the groove portion 150 and the protruding portion 120 may be alternately disposed in the direction in which the cooling fluid flows.

Meanwhile, in the case in which the plurality of battery modules 111 are accommodated in the inner space 110 of the battery pack housing 100, the protruding portion 120 and the groove portion 150 may also be provided as the plurality of protruding portions 120 and the plurality of groove portions 150.

In this case, the protruding portions 120 and the groove portions 150 may have different heights, gaps, widths, forms, or the like in order to optimize the cooling efficiency.

As illustrated in FIGS. 5 to 10, sizes (lengths, widths, and the like) of the protruding portions 120 and the groove portions 150 may increase or decrease in the direction in which the fluid flows, but the present invention is not limited thereto. In addition, although not illustrated in the drawings, the sizes of the protruding portions 120 and the groove portion 150 may differ irregularly.

Meanwhile, as illustrated in FIGS. 11 to 16, the cathode tab 112a and the anode tab 112b of the battery module 111 may be provided on different surfaces of the battery module 111. In this case, the protruding portion 120 may form a space for accommodating one or more electrode tabs 112.

Meanwhile, the groove portion 150 may be formed in the form in which an outer surface of the groove portion 150 is engaged with an outer surface of the protruding portion 120. In this case, when a plurality of battery packs 10 are stacked and used, the plurality of battery packs 10 may be efficiently coupled to each other due to the forms of the protruding portion 120 and the groove portion 150 without specific coupling members so that a volume of the entire battery pack 10 may be reduced.

In addition, a first coupling unit may be formed on one side of an outer surface of the battery pack housing 100, and a second coupling unit corresponding to the form of the first coupling unit and engaged with the first coupling unit may be formed on the other side of the outer surface of the battery pack housing 100. The first coupling unit and the second coupling unit may be formed to have forms engaged with each other between the plurality of battery pack housings in a case in which a plurality of battery packs are mutually arranged side by side so that one side faces the other side. In this case, since the plurality of battery packs 10 may be effectively coupled to each other in the one axial direction, a volume of all of the battery packs 10 may be decreased.

Figure 17:
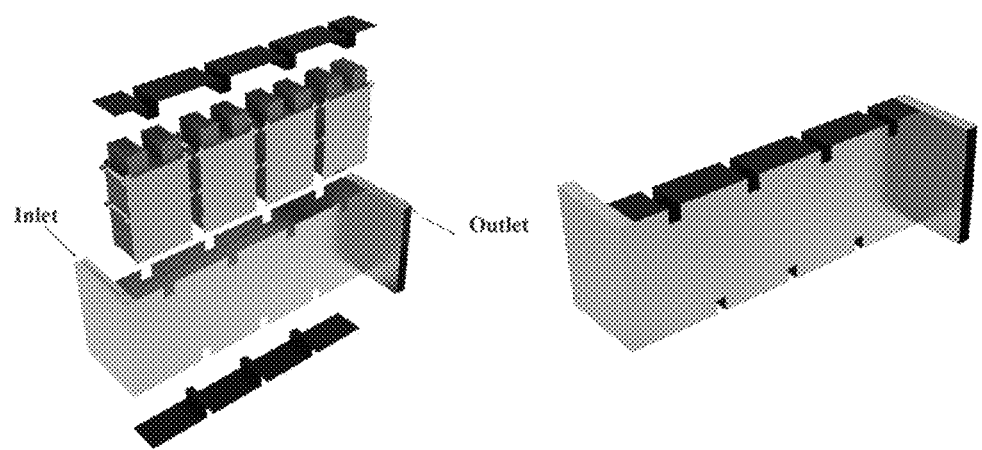
FIG. 17 is an exploded perspective view illustrating a structure of the battery pack according to one embodiment of the present invention.

FIG. 17 illustrates an exploded view, in which the protruding portions 120 formed between the electrode tabs 112 on an upper portion of the battery module 111, the groove portions 150 formed between lower portions of the battery modules 111, the fluid inlet 130 formed on one side surface of the battery pack housing 100, and the fluid outlet 140 formed on the other side surface of the battery pack housing 100 are separated from each other, and a perspective view of an entire exterior of the battery pack 10 in which the above-described components are coupled. As described above, the battery pack housing 100 even with a simple structure according to the present invention may maximize the cooling efficiency of the battery pack 10.

In a battery pack housing according to the present invention, since a cooling fluid introduced into a battery pack flows to generate turbulence around a battery tab at which high-temperature heat is typically generated, a flow rate and a flow velocity of the cooling fluid can be increased around the battery tab, the cooling fluid can be more actively circulated, and a temperature deviation between cells in the battery pack can be effectively reduced so that performance degradation of the battery pack can be prevented and a lifetime of the battery pack can be increased.

Even when the same amount of cooling fluid is used, the cooling efficiency of the battery pack can be improved, and an amount of the fluid needed for cooling can be reduced to simplify an entire system of the battery pack.

In addition, since a protruding portion and a groove portion are formed to have shapes which are engaged with each other, when a plurality of battery packs are used for forming a system, the battery packs can be coupled to each other without additional members so that the entire system can be formed without increasing an unnecessary weight.

As described above, although the present invention has been described with respect to the limited embodiments and drawings, those skilled in the art should appreciate that various modifications and changes may be made in the technical spirit of the present invention and the scope defined in the claims and their equivalents.

What is claimed is:

1. A battery pack housing comprising:
an inner space that accommodates a plurality of battery modules each including a cathode tab and an anode tab;
a plurality of protruding portions protruding from the inner space, side walls of each of the plurality of protruding portions extend between and adjacent to at least one cathode tab and at least one anode tab of the plurality of battery modules, or extend between and adjacent to at least one cathode tab and at least one other cathode tab, or extend between and adjacent to at least one anode tab and at least one other anode tab, wherein a length and/or a width of the plurality of protruding portions increases or decreases in a direction in which a cooling fluid flows;
one or more groove portions provided between the battery modules and formed in a direction from a lower surface of the battery pack housing toward the inner space, wherein a length and/or a width of the one or more groove portions increases or decreases in a direction in which a cooling fluid flows;
a fluid inlet provided on one side surface of the battery pack housing; and
a fluid outlet provided on the other side surface thereof, wherein the fluid inlet and the fluid outlet are configured to form the cooling fluid flow perpendicular to the cooling fluid flow in the housing respectively.

2. The battery pack housing of claim 1, wherein:
the plurality of battery modules are accommodated in the inner space to be spaced apart from each other; and
the plurality of protruding portions are formed to be spaced a distance from each other.

3. The battery pack housing of claim 1, wherein:
the plurality of battery modules may be housed in the internal space so as to be separated from each other; and
one or more of the protruding portions may be housed as a group by selecting one of the cathode tab and the anode tab in each of the adjacent battery modules.

4. The battery pack housing of claim 1, wherein:
the plurality of battery modules are accommodated in the inner space to be spaced apart from each other; and
one or more of the plurality of protruding portions accommodate the cathode tab and the anode tab of one battery module as one group.

5. The battery pack housing of claim 2, wherein the plurality of battery modules are accommodated in the inner space so that the cathode tab and the anode tab face upward.

6. The battery pack housing of claim 5, wherein:
the one or more groove portions are disposed in a lower portion of the battery pack housing in a direction in which the cooling fluid flows;
the protruding portions are disposed in an upper portion of the battery pack housing in the direction in which the cooling fluid flows; and
the one or more groove portions and the protruding portions are alternately disposed in the direction in which the cooling fluid flows.

7. The battery pack housing of claim 5, wherein an outer surface of the one or more groove portions is formed in a form that is engaged with an outer surface of the protruding portion.

8. The battery pack housing of claim 1, further comprising:
a first coupling unit provided on one side of an outer surface of the battery pack housing; and
a second coupling unit which is provided on the other side of the outer surface of the battery pack housing and corresponds to a form of the first coupling unit to be engaged with the first coupling unit.

9. A battery pack comprising the battery pack housing of claim 1.

* * * * *